(12) United States Patent
Pittner (10) Patent No.: US 11,420,673 B2
(45) Date of Patent: Aug. 23, 2022

(54) METHOD FOR OPERATING A STEERING SYSTEM, AND STEERING SYSTEM

(71) Applicant: Robert Bosch GmbH, Stuttgart (DE)

(72) Inventor: Raphael Pittner, Lorch (DE)

(73) Assignee: Robert Bosch GmbH, Stuttgart (DE)

( * ) Notice: Subject to any disclaimer, the term of this patent is extended or adjusted under 35 U.S.C. 154(b) by 396 days.

(21) Appl. No.: 16/617,174

(22) PCT Filed: Apr. 26, 2018

(86) PCT No.: PCT/EP2018/060730
§ 371 (c)(1),
(2) Date: Nov. 26, 2019

(87) PCT Pub. No.: WO2019/007563
PCT Pub. Date: Jan. 10, 2019

(65) Prior Publication Data
US 2021/0146993 A1  May 20, 2021

(30) Foreign Application Priority Data

Jul. 3, 2017 (DE) ...................... 10 2017 211 278.6

(51) Int. Cl.
*B62D 5/04* (2006.01)
(52) U.S. Cl.
CPC ......... *B62D 5/0463* (2013.01); *B62D 5/0424* (2013.01); *B62D 5/0481* (2013.01)
(58) Field of Classification Search
CPC ... B62D 5/0463; B62D 5/0424; B62D 5/0481
See application file for complete search history.

(56) References Cited

U.S. PATENT DOCUMENTS 10,625,774 B2    4/2020  Sworowski et al.
2010/0132451 A1* 6/2010  Bohm ................. A01J 5/01
                                                73/290 R (Continued)

FOREIGN PATENT DOCUMENTS

CN    104724161 A       6/2015
CN    110001762 A  *    7/2019  ............... B62D 3/08

(Continued)

OTHER PUBLICATIONS

International Search Report corresponding to PCT Application No. PCT/EP2018/060730, dated Jul. 18, 2018 (German and English language document) (7 pages).

*Primary Examiner* — Khoi H Tran
*Assistant Examiner* — Jorge O Peche
(74) *Attorney, Agent, or Firm* — Maginot, Moore & Beck LLP (57) ABSTRACT

In a method for operating a steering system, in particular an electrically supported steering system that includes at least one first fluid sensor unit for sensing at least one ingressing first fluid and at least one second fluid sensor unit, spatially separated from the first fluid sensor unit, for sensing at least one ingressing second fluid, at least one first response behaviour is triggered in response to the sensing of the first fluid and at least one second response behaviour, which differs from the first response behaviour at least in part, is triggered in response to the sensing of the second fluid.

13 Claims, 3 Drawing Sheets

(56) References Cited

U.S. PATENT DOCUMENTS

| | | | |
|---|---|---|---|
| 2013/0138299 A1* | 5/2013 | Bhae | B62D 5/0484 701/42 |
| 2015/0175192 A1* | 6/2015 | Sin | B62D 5/0403 318/483 |
| 2017/0050669 A1* | 2/2017 | Asakura | B62D 5/0448 |
| 2018/0194390 A1* | 7/2018 | Goto | B62D 5/0481 |
| 2018/0312192 A1* | 11/2018 | Beer | B62D 5/0406 |
| 2019/0023305 A1* | 1/2019 | Fujimoto | B62D 5/0406 |
| 2019/0193780 A1* | 6/2019 | Rácz | B62D 5/046 |
| 2019/0248408 A1* | 8/2019 | Boda | B62D 5/0487 |
| 2021/0146993 A1* | 5/2021 | Pittner | B62D 5/0424 |

FOREIGN PATENT DOCUMENTS

| | | | | |
|---|---|---|---|---|
| CN | 112067201 A | * | 12/2020 | B62D 5/0403 |
| CN | 112212780 A | * | 1/2021 | B62D 1/20 |
| DE | 10 2006 051 799 A1 | | 5/2008 | |
| DE | 10 2012 023 073 A1 | | 5/2013 | |
| DE | 102012023073 A1 | * | 5/2013 | B62D 5/0406 |
| DE | 10 2015 115 118 A1 | | 3/2017 | |
| DE | 102015115118 A1 | * | 3/2017 | B62D 5/0406 |
| DE | 11 2015 005 612 T5 | | 9/2017 | |
| DE | 102017200429 A1 | * | 7/2018 | B62D 5/0424 |
| JP | H04-255176 A | | 9/1992 | |
| JP | 2006-111032 A | | 4/2006 | |
| JP | 2006111032 A | * | 4/2006 | |
| JP | 2008-204991 A | | 9/2008 | |
| JP | 2010-38374 A | | 2/2010 | |
| JP | 2017-39460 A | | 2/2017 | |
| KR | 10-1305749 B1 | | 9/2013 | |
| WO | 2016/098557 A1 | | 6/2016 | |
| WO | WO-2016098557 A1 | * | 6/2016 | B60R 16/02 |
| WO | 2016/131506 A1 | | 8/2016 | |
| WO | WO-2017006623 A1 | * | 1/2017 | B62D 5/046 |
| WO | WO-2017145599 A1 | * | 8/2017 | B62D 5/0406 |
| WO | WO-2018041331 A1 | * | 3/2018 | B62D 5/04 |

* cited by examiner

Fig. 1

Fig. 3 ized support device for producing and/or providing steering assistance, and a sensor device for detecting fluid ingress. The sensor device is provided mainly for detecting water ingress into a servo-motor housing of the support unit, and does not allow differentiated detection of fluids entering the steering system, such as for example the detection of different fluids or the detection of fluids in different regions of the steering system. This means that a response behavior of the steering system to water ingress is always the same, in particular irrespective of the quantity and/or location of ingress, and the response of the steering system cannot be adapted depending on the situation, which greatly restricts the flexibility of the steering system.

METHOD FOR OPERATING A STEERING SYSTEM, AND STEERING SYSTEM

This application is a 35 U.S.C. § 371 National Stage Application of PCT/EP2018/060730, filed on Apr. 26, 2018, which claims the benefit of priority to Serial No. DE 10 2017 211 278.6, filed on Jul. 3, 2017 in Germany, the disclosures of which are incorporated herein by reference in their entirety.

The disclosure concerns a method for operating a steering system and to a steering system.

The disclosure also concerns a control device.

DE 10 2006 051 799 A1 describes an electrically supported steering system which comprises a steering gear, an electrically configured support device for producing and/or providing steering assistance, and a sensor device for detecting fluid ingress. The sensor device is provided mainly for detecting water ingress into a servo-motor housing of the support unit, and does not allow differentiated detection of fluids entering the steering system, such as for example the detection of different fluids or the detection of fluids in different regions of the steering system. This means that a response behavior of the steering system to water ingress is always the same, in particular irrespective of the quantity and/or location of ingress, and the response of the steering system cannot be adapted depending on the situation, which greatly restricts the flexibility of the steering system.

The object of the disclosure is in particular to propose a method for operating a steering system, and a steering system, with improved properties with regard to flexibility, and in particular with an advantageously flexible response behavior. The object is achieved by the characteristic features described herein.

SUMMARY

The disclosure is based on a method for operating a steering system, in particular an electrically supported steering system, wherein the steering system comprises at least one first fluid sensor unit for detecting at least one ingressing first fluid, in particular a first foreign substance, and at least one second fluid sensor unit, spatially separated from the first fluid sensor unit, for detecting at least one ingressing second fluid, in particular a second foreign substance.

It is proposed that at least one first response behavior is triggered and in particular executed in response to the detection of the first fluid, and at least one second response behavior, which at least partially differs from the first response behavior, is triggered and in particular executed in response to the detection of the second fluid. With this embodiment, in particular a method may be provided with an advantageously great flexibility. In particular, an advantageously flexible and/or situation-dependent response behavior may be achieved, which advantageously is adapted to different malfunctions. Furthermore, advantageously, in response to detection of a fluid, different measures may be taken such as for example complete shut-down of the steering system, a degraded operation of the steering system, a change to a specific driving mode, and/or simply production of a notification and/or warning message.

A "steering system" in this context in particular means at least a part, in particular a subassembly, of a vehicle and preferably a motor vehicle. In particular, the steering system is provided at least in order to influence a travel direction of the vehicle. Here, the vehicle advantageously comprises at least two different driving modes, in particular a conventional and/or manual driving mode and an autonomous and/or semi-autonomous driving mode. Furthermore, an "electrically supported steering system" means in particular a steering system with electric auxiliary power assistance, in which in particular at least one support unit for producing and/or providing steering assistance is configured so as to be electrical, and in particular comprises a motor, preferably is configured as an electric motor, for providing the steering assistance. Also, the steering system comprises at least one calculation unit, which in particular is provided to execute the method for operation of the steering system. In addition, the steering system may comprise further components and/or assemblies such as for example at least one steering unit, at least one steering column, at least one steering gear, at least one support unit which is in particular actively connected to the steering gear for producing and/or providing steering assistance, and/or at least one output unit for output of a notification and/or warning message, in particular acoustically, haptically and/or optically, depending on the fluid detected. The term "provided" in particular means specially programmed, designed and/or equipped. The statement that an object is provided for a specific function, means in particular that the object fulfils and/or executes this specific function in at least one application and/or operating state.

A "fluid sensor unit" means in particular a unit, in particular actively connected to the calculation unit, which serves to detect at least one fluid, preferably with a specific aggregation state, in particular a gas or a liquid. In particular, for this the fluid sensor unit comprises at least one sensor element which advantageously may be configured as a passive and/or active sensor. In addition, the fluid sensor unit is provided in particular to provide a detection signal correlating to the detected fluid, and transmit this to the calculation unit, in particular wirelessly and/or advantageously via a hard-wired connection. The first fluid and/or the second fluid in the present case may in particular be a gas, preferably an air humidity, in particular a relative humidity, or a liquid, preferably water, in particular rainwater, floodwater and/or contaminated water, such as for example from the road. The statement that "the fluid sensor units are spatially separated from each other" in particular means that the fluid sensor units are assigned to different spatial regions which in particular are fluidically separated from each other, and/or are arranged in different spatial regions which in particular are fluidically separated from each other. Particularly preferably, the first fluid sensor unit and the second fluid sensor unit are different from redundant fluid sensor units provided simply to increase operating reliability.

Furthermore, a "calculation unit" means in particular an electronic unit which has an information input, an information processing device and an information output. Advantageously, the calculation unit furthermore comprises at least one processor, at least one memory, at least one input and/or output means, at least one operating program, at least one control routine, at least one regulation routine, at least one calculation routine, at least one analysis routine and/or at least one trigger routine. In particular, the calculation unit is provided at least in order to assign at least one first response behavior to the first fluid sensor unit, and to assign at least one second response behavior, which is at least partially different from the first response behavior, to the second fluid sensor unit, and in particular to trigger the first response behavior in response to detection of the first fluid, and to trigger the second response behavior in response to the detection of the second fluid. Preferably, the calculation unit is also integrated in a control device of the steering system.

In addition, a "response behavior" means in particular a specific behavior and/or specific response of the calculation unit and/or steering system, which is triggered and/or executed on detection of the corresponding fluid, in particular in order to avoid a malfunction of the steering system and/or a danger to an occupant of the vehicle. In particular, the response behavior may consist of precisely one action which may be triggered and/or executed in particular immediately after detection of the fluid or with a time delay after detection of the fluid. Alternatively or additionally, a response behavior may also advantageously comprise several actions which in particular are triggered and/or executed simultaneously and/or temporally successively, such as for example at regular time intervals. The response behavior may comprise amongst others actions such as for example complete shutdown of the steering system, a degraded operation of the steering system, in particular a shutdown of certain components and/or assemblies of the steering system and/or operation with reduced power, a change and/or exiting of a current driving mode, and/or production of a notification and/or warning message, in particular acoustically, haptically and/or optically.

The first response behavior and the second response behavior could for example trigger and/or execute an identical action, and differ from each other merely in a speed of response. Advantageously however, it is proposed that the first response behavior and the second response behavior differ from each other at least in a type of a response, and hence in particular in at least one triggered and/or executed action, whereby in particular a steering system may be provided which is advantageously adaptable to different conditions.

It is furthermore proposed that the first response behavior and the second response behavior differ from each other at least in a speed of a response, and hence in particular in a duration before the triggering and/or execution of at least one action. In this way, in particular a response behavior which is adapted according to the situation can be achieved.

In addition, it is proposed that the first response behavior causes a temporally faster response, in particular—depending on requirement—in a period of maximum 15 minutes, advantageously maximum 5 minutes, preferably maximum 1 minute, and particularly preferably maximum 30 seconds; and the second response behavior causes a temporally slower response in comparison with the first response behavior, in particular—depending on requirement—in a period of at least several hours, at least several days, at least several weeks and/or at least several months. In this way, in particular a response behavior may advantageously be adapted to different conditions and/or different critical fault states. Also, in a non-critical fault state, for example a driver may be given the opportunity to contact a workshop him/herself, whereby advantageously convenience may be improved and/or costs minimized.

In a further embodiment of the disclosure, it is proposed that a current driving mode, in particular from a group of different driving modes comprising at least one conventional and/or manual driving mode and an autonomous and/or semi-autonomous driving mode, is taken into account in at least one of the response behaviors, in particular the first response behavior and/or the second response behavior, and a response linked to the response behavior, and hence in particular a triggered and/or executed action, is adapted depending on the current driving mode. Advantageously, thus an action and/or response linked to the corresponding response behavior may differ depending on whether the current driving mode is a conventional and/or manual driving mode, or an autonomous and/or semi-autonomous driving mode. Particularly preferably, in at least one operating state in which a current driving mode is an autonomous and/or semi-autonomous driving mode, the at least one response behavior here comprises at least one action which leads to exiting of the autonomous and/or semi-autonomous driving mode. This embodiment advantageously allows an increase in operating safety.

A particularly great flexibility and/or particularly precise detection of an ingressing fluid may be achieved in particular if fluid sensor units of different types are used as the first fluid sensor unit and as the second fluid sensor unit. In particular, the first fluid sensor unit and the second fluid unit are of different types. The phrase "fluid sensor units of different types" in this context means in particular fluid sensor units which differ at least partially from each other in particular in their function, structure, detection accuracy, detection type and/or detection mechanism.

The first fluid sensor unit and the second fluid sensor unit may for example have a different detection accuracy and/or a different detection mechanism, and hence in particular be provided to detect fluids with the same aggregation state. In a preferred embodiment of the disclosure however, it is proposed that fluids with different aggregation states are detected by means of the first fluid sensor unit and the second fluid sensor unit. In particular, the first fluid sensor unit and the second fluid sensor unit are provided to detect fluids with different aggregation states. Preferably, the first fluid is a liquid, preferably water, and the second fluid is a gas, preferably an air humidity, in particular a relative humidity. Particularly preferably, for this the first fluid sensor unit comprises at least one first sensor element configured as a liquid sensor, and the second fluid sensor unit comprises at least one second sensor element configured as a moisture sensor. In this way, advantageously fluids with different aggregation states may be detected and a response behavior adapted to these fluids.

Preferably, it is furthermore proposed that spatially separated regions of the steering system are monitored by means of the first fluid sensor unit and the second fluid sensor unit, in particular internal regions such as for example an interior of a gear casing of the gear unit, an interior of a support housing of the support unit, and/or an interior of a control housing of the control device; and/or external regions such as for example plug connections for connection of electronic components of the steering system, external components of the steering system, external components of the support unit, and/or sealing units of the gear casing, support housing and/or control housing. In this way, in particular sensitive components of the steering system may be protected and a material deterioration and/or corrosion of external components of the steering system may be monitored.

Particularly advantageously, it is proposed that the first fluid sensor unit monitors at least one region of a control device, in particular the above-mentioned control device, and/or of a support unit, in particular the above-mentioned support unit, for producing and/or providing steering assistance, and the second fluid sensor unit monitors at least one region of a steering gear, in particular the above-mentioned steering gear. In this way, advantageously a high operating reliability can be guaranteed. Preferably, the first fluid sensor unit is arranged in the region of the control device and/or the support unit, and the second fluid sensor unit is arranged in the region of the steering gear. The phrase "a region of an object" in particular means a volume of a minimal theoretical cube which still completely surrounds the object.

According to a further aspect of the disclosure, which in particular may be implemented alone or advantageously in addition to the above-mentioned aspects of the disclosure, and preferably combined with at least some, advantageously at least a majority and preferably all the above-mentioned aspects, a steering system is proposed, in particular an electrically supported steering system, with at least one first fluid sensor unit for detecting at least one ingressing first fluid, in particular a first foreign substance, with at least one second fluid sensor unit, spatially separated from the first fluid sensor unit, for detecting at least one ingressing second fluid, in particular a second foreign substance, and with at least one calculation unit, wherein the first fluid sensor unit and the second fluid sensor unit are connected to the calculation unit via separate logic connections. In this way, in particular the above-mentioned advantages may be achieved. In particular, with a corresponding design of the steering system, an advantageously great flexibility may be achieved. In particular, advantageously flexible and or situation-dependent response behavior may be achieved, which advantageously is adapted to different malfunctions. Furthermore, advantageously in response to the detection of a fluid, different measures may be taken such as for example complete shutdown of the steering system, a degraded operation of the steering system, a change to a specific driving mode, and/or simply production of a notification and/or warning message. In addition, an advantageously simple control algorithm may be provided. The phrase that "the fluid sensor units are connected to the calculation unit via separate logic connections" in particular means that the fluid sensor units are provided to transmit a detection signal, which correlates to the detected fluid and is preferably formed as a logic signal, to the calculation unit on separate logic paths, and the calculation unit is in particular provided to derive a different response behavior from the respective detection signals. In addition, the first fluid sensor unit and the second fluid sensor unit are preferably of different types, and particularly advantageously are provided to detect fluids with different aggregation states. Also, the first fluid sensor unit is preferably arranged in a region of a control device of the steering system, in particular the above-mentioned control device, and/or of a support unit of the steering system, in particular the above-mentioned support unit, for producing and/or providing a steering assistance, and the second fluid sensor unit is arranged in a region of a steering gear, in particular the above-mentioned steering gear, of the steering system.

The method for operating the steering system, and the steering system, are not restricted to the above-mentioned application and embodiment. In particular, the method for operating the steering system, and the steering system, may comprise a number of individual elements, components and units which differ from the number cited herein, in order to fulfil a function described herein.

BRIEF DESCRIPTION OF THE DRAWINGS

Further advantages arise from the following description of the drawings. The drawings depict an exemplary embodiment of the disclosure. The drawing, description and claims contain numerous features in combination. The person skilled in the art will also, where appropriate, consider the features individually and combine them into sensible further combinations.

The drawings show.

DETAILED DESCRIPTION

Figure 1:
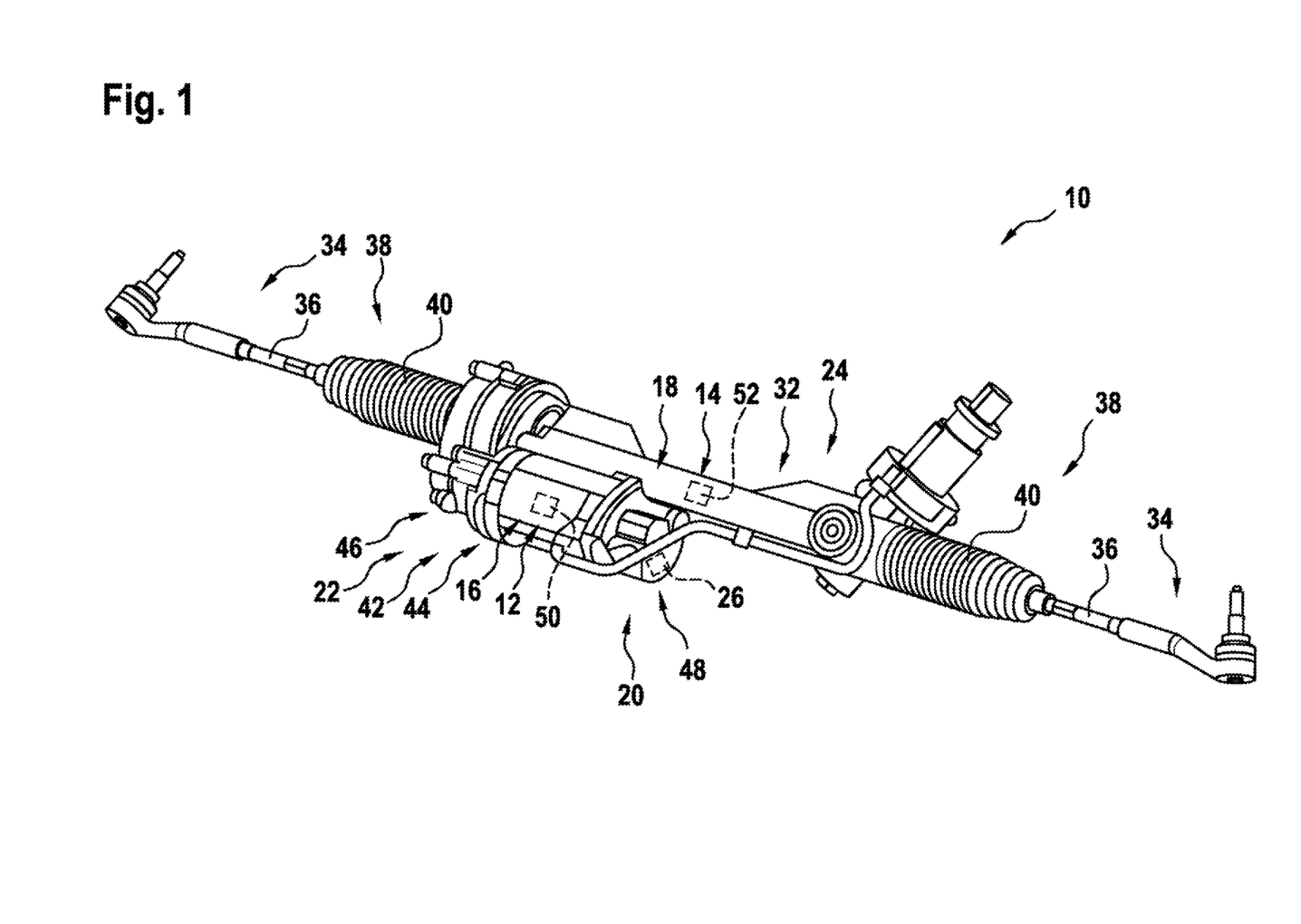
FIG. 1 at least part of an exemplary steering system in a perspective depiction, FIG. 2 a connecting diagram of a calculation unit and two fluid sensor units of the steering system in a diagrammatic depiction, and FIG. 3 an exemplary flow diagram of a method for operating the steering system.

FIG. 1 shows at least part of an exemplary steering system 10 in a perspective depiction. The steering system 10 in the present case is configured as an electrically supported steering system, and accordingly comprises an electric auxiliary power assistance. Furthermore, the steering system 10 is provided for use in a vehicle (not shown), in particular a motor vehicle. The vehicle here comprises for example at least two different driving modes, in particular a conventional and/or manual driving mode, and an autonomous and/or semi-autonomous driving mode. The steering system 10 in installed state is actively connected to vehicle wheels of the vehicle, and is provided to influence a travel direction of the vehicle. In principle however, it is also conceivable to configure a steering system as a hydraulically supported steering system, in particular with a hydraulic auxiliary power assistance. Also, a vehicle could have precisely one driving mode, in particular a conventional and/or manual driving mode, or an autonomous and/or semi-autonomous driving mode.

The steering system 10 comprises a steering gear 24. The steering gear 24 is configured as a toothed rack steering gear, known in itself, in the present case for example as a recirculating ball steering gear.

The steering gear 24 comprises a gear casing 32. The gear casing 32 is configured as an external casing. The gear casing 32 is configured as a receptacle and is provided in particular to receive and/or mount at least a majority of the components required for operation of the steering gear 24. The steering gear 24 furthermore comprises at least one steering pinion (not shown) arranged in the gear casing 32, and a toothed rack (not shown) arranged in the gear casing 32 and mechanically coupled to the steering pinion.

In addition, the steering gear 24 has an active connection to at least two of the vehicle wheels, in particular two front wheels of the vehicle. The steering gear 24 is provided to cause a pivot movement and/or a rotational movement of the vehicle wheels. The steering gear 24 is provided to convert a steering command into a steering movement of the vehicle wheels. In principle, a steering gear could also be configured as a worm screw steering gear and/or as a screw spindle steering gear.

The steering system 10 furthermore comprises at least one steering linkage 34, in particular with at least one track rod 36. In the present case, the steering system 10 comprises a corresponding steering linkage 34 on each side of the vehicle, which connects the steering gear 24, in particular the toothed rack, mechanically to one of the vehicle wheels. In principle however, it is also conceivable to omit the steering linkage, and/or integrate a steering linkage in a steering gear.

The steering system 10 also comprises at least one sealing unit 38, in particular with at least one gaiter 40. In the present case, the steering system 10 comprises a corresponding sealing unit 38 on each side of the vehicle, which seals the gear casing 32 and steering linkage 34 fluidically against each other. In principle however, it is also conceivable to configure the sealing unit differently, and for example omit the gaiter.

In addition, the steering system 10 comprises a support unit 22, known in itself, for producing and/or providing steering assistance. The support unit 22 is configured so as to be electrical. The support unit 22 has an active connection to a steering gear 24.

The support unit 22 comprises a support housing 42. The support housing 42 is configured as an external housing. In the present case, the support housing 42 is formed from several pieces and comprises at least a motor housing 44 and a connecting housing 46. The support housing 42 is formed as a receptacle and is provided in particular to receive and/or mount at least a majority of the components necessary for operation of the support unit 22.

The support unit 22 furthermore comprises a motor (not shown), in the present case in particular configured as an electric motor. The motor is arranged in the motor housing 44. The motor is provided to produce steering assistance. Also, the support unit 22 comprises a ball screw drive (not shown) which is arranged in the connecting housing 46 and is coupled to the toothed rod, and a belt which is arranged in the connecting housing 46 for transmitting force between the motor and the ball screw drive.

The support unit 22 is provided to introduce a support moment into the steering gear 24, in particular via the belt and the ball screw drive. The support unit 22 is provided to support a manual steering moment which in particular is applied by a driver. Alternatively, a support unit could also be configured at least partially hydraulically. In addition, a support unit may also comprise, in particular instead of a belt with a ball screw drive, for example a drive pinion, in particular an additional drive pinion. Also, a support unit may also be provided to introduce a support moment into a steering column. In addition, a support housing could have precisely one housing part, in particular a motor housing or a connecting housing. Also, it is conceivable to configure a support housing so as to be integral with a gear casing, or to omit a support housing completely.

The steering system 10 furthermore comprises a control device 20. The control device 20 comprises a control housing 48. The control housing 48 is configured as an external housing. The control housing 48 is formed as a receptacle and in particular provided to receive and/or mount at least a majority of the components required for operation of the control device 20. In the present case, the control housing 48 is directly coupled to the support housing 42. For this, the control device 20 and the support unit 22 form a common assembly known as a power pack.

The control device 20 furthermore comprises a calculation unit 26. The calculation unit 26 is arranged in the control housing 48. The calculation unit 26 is configured so as to be electronic. The calculation unit 26 comprises at least one processor (not shown), for example in the form of a microprocessor, and at least one memory (not shown). Also, the calculation unit 26 comprises at least one operating program stored in the memory, with at least one calculation routine, at least one control routine, at least one analysis routine and at least one trigger routine.

In addition, the steering system 10 may comprise further components and/or assemblies, such as for example at least one steering unit preferably formed as a steering wheel, and/or at least one steering column, in particular coupled to the steering gear.

According to the disclosure, the steering system 10 furthermore comprises at least two fluid sensor units 12, 14. The fluid sensor units 12, 14 are arranged spatially separately from each other. The fluid sensor units 12, 14 are provided to monitor spatially separated regions 16, 18.

Accordingly, in operation, spatially separated regions 16, 18 are monitored by means of the fluid sensor units 12, 14. Also, the fluid sensor units 12, 14 are of different types. The fluid sensor units 12, 14 in the present case are provided to detect fluids with different aggregation states. Accordingly, in operation, fluids with different aggregation states are detected by means of the fluid sensor units 12, 14. Alternatively, a steering system may also comprise at least three and/or at least four spatially separate fluid sensor units.

A first fluid sensor unit 12 of the fluid sensor units 12, 14 is arranged in a first region 16, in particular a region of the support unit 22. In the present case, the first fluid sensor unit 12 is arranged for example in the motor housing 44. The first fluid sensor unit 12 is here provided to monitor the first region 16. The first fluid sensor unit 12 is provided to detect an ingressing first fluid, in particular a first foreign substance. In the present case, the first fluid sensor unit 12 is provided to detect an ingressing liquid, in particular ingressing water, in particular entering the support unit 22 and in particular the motor housing 44. The first fluid sensor unit 12 is provided to detect the first fluid throughout an entire operating time and/or an entire service life of the steering system 10 and/or the vehicle. Also, the first fluid sensor unit 12 is provided to supply a first detection signal correlating to a detected first fluid.

For this, the first fluid sensor unit 12 comprises at least one first sensor element 50. In the present case, the first fluid sensor unit 12 comprises precisely one first sensor element 50 configured as a liquid sensor.

Alternatively or additionally, a first fluid sensor unit or a further fluid sensor unit could also however be arranged in a connecting housing of a support unit, such as for example in the region of a motor shaft output side and/or a belt pulley, in a control housing of a control device, and/or in the region of a plug connection for connection of electronic parts of the steering system, such as for example in the region of a so-called water pin of a plug connector of the control device. In the latter case, advantageously a liquid may be detected which runs in and/or is drawn in via a wiring harness. Also, a first fluid sensor unit could also comprise several first sensor elements, such as for example at least two or at least three first sensor elements. Also, a first fluid could also be a cooling liquid and/or oil or similar.

A second fluid sensor unit 14 of the fluid sensor units 12, 14 is arranged in a second region 18, in particular a region of the steering gear 24. In the present case, the second fluid sensor unit 14 is arranged for example in the gear casing 32. The second fluid sensor unit 14 is provided to monitor the second region 18. The second fluid sensor unit 14 is provided to detect an ingressing second fluid, in particular a second foreign substance. In the present case, the second fluid sensor unit 14 is provided to detect an ingressing gas, in particular a relative air humidity, in particular inside the gear casing 32. The second fluid sensor unit 14 is provided to detect the second fluid throughout an entire operating time and/or an entire service life of the steering system 10 and/or the vehicle. Also, the second fluid sensor unit is provided to supply a second detection signal correlating with a detected second fluid.

For this, the second fluid sensor unit 14 comprises at least one second sensor element 52. In the present case, the second fluid sensor unit 14 comprises precisely one second sensor element 52 configured as a moisture sensor.

Alternatively or additionally, a second fluid sensor unit or a further fluid sensor unit may however also be arranged in a connecting housing of a support unit, such as for example in the region of a motor shaft output side and/or a belt pulley, in a control housing of a control device, and/or in a region of a steering pinion and/or a pressure pad of the steering system. Also, a second fluid sensor unit could also comprise several second sensor elements, such as for example at least two or at least three second sensor elements. Also, a second fluid could also comprise an exhaust gas and/or a combustion gas, for example from melting cables or similar.

Figure 2:
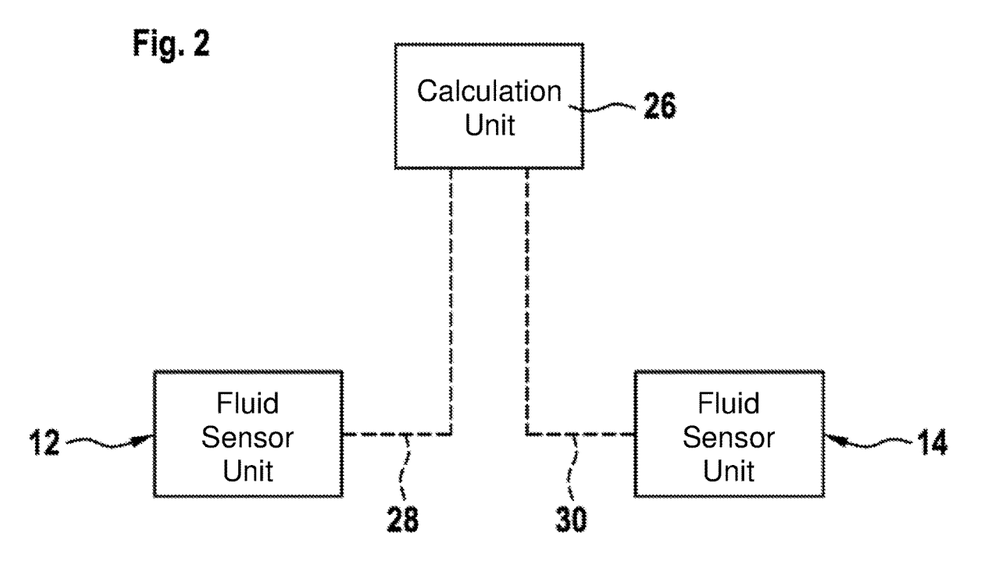

To evaluate the detection signals from the fluid sensor units 12, 14, the fluid sensor units 12, 14 each have an active connection to the calculation unit 26 (see in particular FIG. 2). In the present case, the first fluid sensor unit 12 and the second fluid sensor unit 14 are connected to the calculation unit 26 via separate logic connections 28, 30. The fluid sensor units 12, 14 are provided to transmit the corresponding detection signal, correlating to the detected fluid and configured as a logic signal, to the calculation unit 26 on separate logic paths so that the calculation unit 26 can distinguish the detection signals and clearly assign these to one of the fluid sensor units 12, 14. Alternatively, a first fluid sensor unit and a second fluid sensor unit could also be connected to a calculation unit by means of a single connection path and/or wirelessly. In this case, it is conceivable for example that the first fluid sensor unit and/or the second fluid sensor unit are provided to encode a respective detection signal accordingly, so that the calculation unit can clearly identify the fluid sensor units using the respective coding.

In addition, in the present case, according to the disclosure, the calculation unit 26 is provided to trigger at least a first response behavior in response to detection of the first fluid, and at least a second response behavior, which differs at least partially from the first response behavior, in response to detection of the second fluid, whereby in particular an advantageously flexible and/or situation-dependent response behavior may be achieved. In principle, it is conceivable that the calculation unit 26 itself decides on the performance of the corresponding response behavior, and/or itself implements the corresponding response behavior. Preferably however, the calculation unit 26 has a connection to a further central control device (not shown) of the vehicle, wherein the further control device decides on performance of the corresponding response behavior and implements the corresponding response behavior.

The first response behavior, which in the present case follows in particular a detection of water ingress, and the second response behavior, which in the present case correlates in particular to a relative air humidity in the steering system 10, in particular in the gear casing 32, differ from each other at least in a type of response.

Also, the first response behavior and the second response behavior differ from each other at least in a speed of response. The first response behavior causes a temporally faster response, in particular in a first period of between 30 seconds and 60 seconds depending on requirements, whereby in particular the support unit 22 and the control device 20 may be protected from function deterioration, while the second response behavior performs a temporally slower response in comparison with the first response behavior, in particular in a second period of several days, several weeks or several months, and in particular depending on a value and/or a level of the relative air humidity.

Furthermore, in the present case, at least for the first response behavior, a current driving mode is taken into account and a response linked to the response behavior is adapted according to the current driving mode. Here advantageously, in at least one operating state in which a current driving mode is an autonomous and/or semi-autonomous driving mode, at least one action is performed which leads to exiting the autonomous and/or semi-autonomous driving mode.

A typical first response behavior, which in particular is performed in a defined first period of between 30 seconds and 60 seconds, may for example comprise a complete shutdown of the steering system 10, a degraded operation of the steering system 10, the implementation of a "save-stop" and subsequent shutdown of the support unit 22 and/or control device 20, and/or—in at least one operating state in which a current driving mode corresponds to the autonomous and/or semi-autonomous driving mode—exiting the current driving mode. In the latter case, a driver may advantageously be requested to take over the steering of the vehicle in the first period of between 30 seconds and 60 seconds.

A typical second response behavior, which is performed in particular in the defined second period of several days, several weeks or several months, may for example consist of producing a notification and/or warning message, and/or a prohibition on use of the autonomous and/or semi-autonomous driving mode, and/or a blocking of the steering system 10 on a starting process. To trigger the second response behavior, preferably a value of the relative air humidity is accumulated and/or integrated over the operating hours of the steering system 10 and/or an entire service life of the steering system 10, for example by means of an averaged estimated value of the relative air humidity for times in which the steering system 10 is not operated, and compared with a defined and/or definable limit value, wherein the second response behavior is triggered when the limit value is exceeded.

Figure 3:
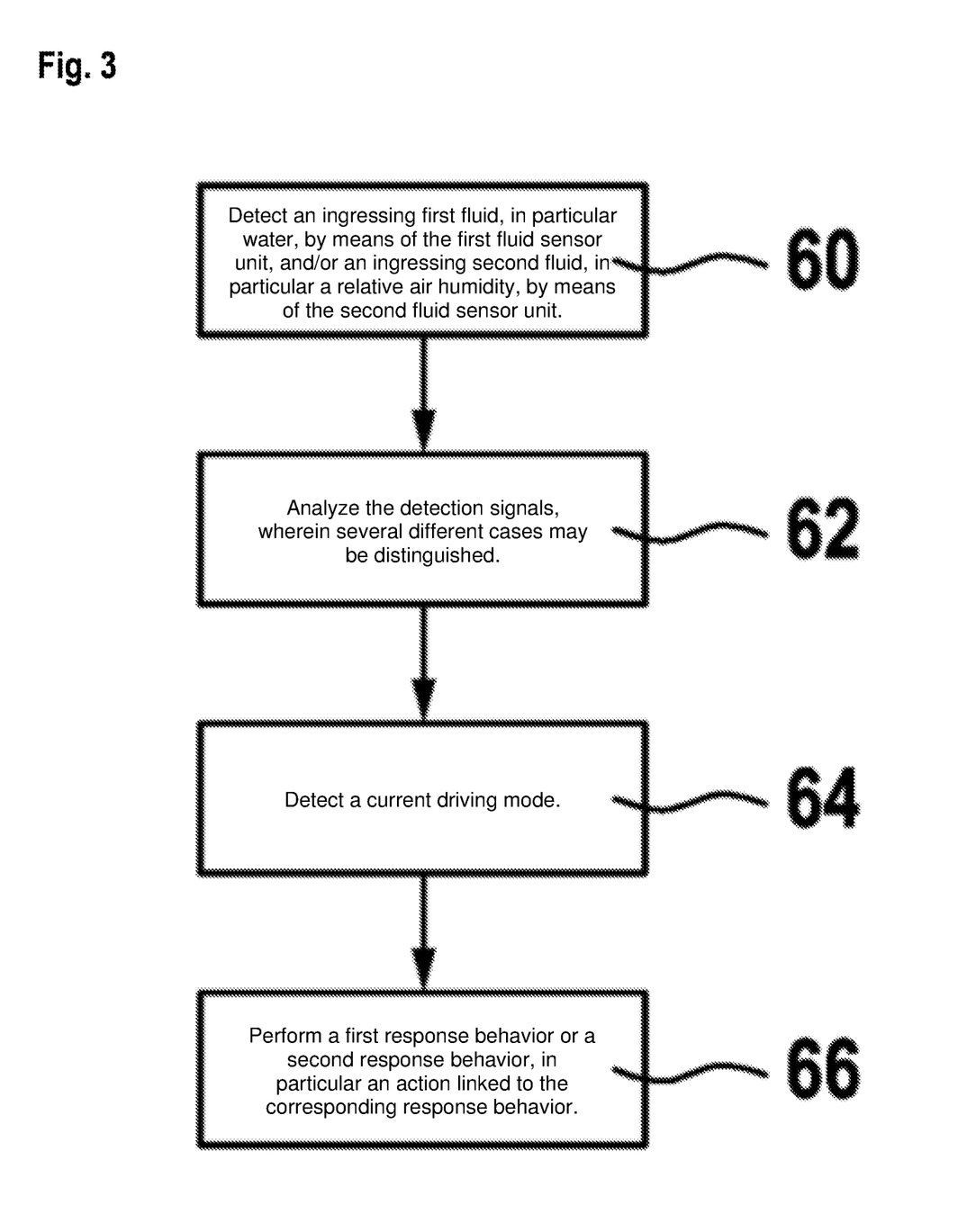

FIG. 3 shows an exemplary flow diagram of such a method for operating the steering system 10, wherein the calculation unit 26 is provided to perform the method, and for this in particular comprises a computer program with corresponding program code means.

In a method step 60, an ingressing first fluid, in particular water, is detected by means of the first fluid sensor unit 12, and/or an ingressing second fluid, in particular a relative air humidity, is detected by means of the second fluid sensor unit 14. The first fluid sensor unit 12 and the second fluid sensor unit 14 are provided to detect a corresponding fluid throughout an entire operating time and/or entire service life of the steering system 10 and/or the vehicle. The first fluid sensor unit 12 provides a first detection signal as a function of the detected first fluid. The second fluid sensor unit 14 provides a second detection signal as a function of the detected second fluid. The first detection signal and the second detection signal are logic signals in the present case.

In a subsequent method step 62, the detection signals are analyzed, wherein several different cases may be distinguished.

If no fluid is detected by means of the fluid sensor units 12, 14, and/or no detection signal is supplied by the fluid sensor units 12, 14, no response behavior is triggered.

If only a first fluid is detected by means of the first fluid sensor unit 12, and/or only the first detection signal is supplied, the first response behavior is triggered, in particular a rapid response.

If only a second fluid is detected by means of the second fluid sensor unit 14, and/or only the second detection signal is supplied, the second response behavior is triggered, in particular a slow response.

If a fluid is detected by means of the first fluid sensor unit 12 and the second fluid sensor unit 14, and/or the first detection signal and the second detection signal are supplied, the first response behavior is triggered, in particular a rapid response.

In the following method step 64, a current driving mode is detected. At least for the first response behavior, a response linked to the first response behavior is adapted then depending on the current driving mode.

In a following method step 66, the first response behavior or the second response behavior is performed, and thus in particular an action linked to the corresponding response behavior is performed.

The exemplary flow diagram in FIG. 3 describes in particular, merely as an example, a method for operating the steering system 10. In particular, individual method steps and/or a sequence of method steps may vary. For example, detection of a current driving mode, and hence in particular method step 64, may be omitted. It is also conceivable to detect a current driving mode temporally before detection of a fluid.

The invention claimed is:

1. A method for operating a steering system comprising:
triggering at least one first response behavior in response to detection of at least one first ingressing fluid by at least one first fluid sensor of the steering system, the at least one first fluid sensor being configured to monitor a first region including at least one of a controller and an electric motor configured to provide steering assistance; and
triggering at least one second response behavior, which at least partially differs from the at least one first response behavior, in response to detection of at least one second ingressing fluid by at least one second fluid sensor, the at least one second fluid sensor being configured to monitor a second region including a steering gear that is spatially separated from the first region,
wherein the at least one first response behavior and the at least one second response behavior differ from each other at least in a type of a response.

2. The method as claimed in claim 1, wherein the at least one first response behavior and the at least one second response behavior differ from each other at least in a speed of response.

3. The method as claimed in claim 2, wherein the at least one first response behavior causes a temporally faster response, and the at least one second response behavior causes a temporally slower response in comparison with the at least one first response behavior.

4. The method as claimed in claim 1, wherein a current driving mode is taken into account in at least one of the first and second response behaviors, and a response linked to the at least one of the first and second response behaviors is adapted depending on the current driving mode.

5. The method as claimed in claim 1, wherein the at least one first fluid sensor unit is of a different type than the at least one second fluid sensor.

6. The method as claimed in claim 1, wherein the at least one first ingressing fluid that the at least one first fluid sensor is configured to detect is of a different aggregation state than the at least one second ingressing fluid that the at least one second fluid sensor is configured to detect.

7. The method as claimed in claim 1, wherein the method is executed in an electrically supported steering system.

8. A control device of a steering system comprising:
a processor configured to:
trigger at least one first response behavior in response to detection of at least one ingressing first fluid by at least one first fluid sensor, the at least one first fluid sensor being configured to monitor a first region including at least one of a controller and an electric motor configured to provide steering assistance; and
trigger at least one second response behavior, which at least partially differs from the at least one first response behavior, in response to detection of at least one ingressing second fluid by at least one second fluid sensor, the at least one second fluid sensor being configured to monitor a second region including a steering gear that is spatially separated from the first region,
wherein the at least one first response behavior and the at least one second response behavior differ from each other at least in a type of response.

9. A steering system, comprising:
at least one first fluid sensor configured to detect at least one ingressing first fluid, the at least one first fluid sensor being configured to monitor a first region including at least one of a controller and an electric motor configured to provide steering assistance;
at least one second fluid sensor configured to detect at least one ingressing second fluid, the at least one second fluid sensor being configured to monitor a second region including a steering gear that is spatially separated from the first region; and
at least one processor configured to:
trigger at least one first response behavior in response to the detection of the at least one first fluid; and
trigger at least one second response behavior, which at least partially differs from the first response behavior, in response to the detection of the at least one second fluid,
wherein the at least one first response behavior and the at least one second response behavior differ from each other at least in a type of response.

10. The steering system as claimed in claim 9, wherein the at least one first fluid sensor and the at least one second fluid sensor are connected to the at least one processor via separate logic connections.

11. The steering system as claimed in claim 9, wherein the at least one first fluid sensor and the at least one second fluid sensor are of different types and are configured to detect fluids with different aggregation states.

12. The steering system as claimed in claim 9, wherein the at least one first fluid sensor is arranged in a region of at least one of a control device of the steering system and a support unit of the steering system configured to produce and/or provide steering assistance, and the at least one second fluid sensor is arranged in a region of a steering gear of the steering system.

13. The steering system as claimed in claim 9, wherein the steering system is an electrically supported steering system.

* * * * *